United States Patent
Brown

(10) Patent No.: US 12,535,055 B1
(45) Date of Patent: Jan. 27, 2026

(54) SYSTEMS AND METHODS FOR OPTIMAL PHASE SHIFT BETWEEN DYNAMIC CONTROL ACTIONS FOR WIND TURBINES

(71) Applicant: National Technology & Engineering Solutions of Sandia, LLC, Albuquerque, NM (US)

(72) Inventor: Kenneth Brown, Albuquerque, NM (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 0 days.

(21) Appl. No.: 18/095,358

(22) Filed: Jan. 10, 2023

Related U.S. Application Data

(60) Provisional application No. 63/298,144, filed on Jan. 10, 2022.

(51) Int. Cl.
  *F03D 7/04* (2006.01)
  *F03D 1/06* (2006.01)
  *F03D 7/02* (2006.01)

(52) U.S. Cl.
  CPC .............. *F03D 7/048* (2013.01); *F03D 1/06* (2013.01); *F03D 7/0224* (2013.01); *F03D 7/0276* (2013.01); *F05B 2270/204* (2020.08)

(58) Field of Classification Search
  CPC ........ F03D 7/048; F03D 7/049; F03D 17/007; F03D 17/008; F05B 2270/204
  See application file for complete search history.

(56) References Cited

U.S. PATENT DOCUMENTS

| | | | |
|---|---|---|---|
| 9,835,138 B2* | 12/2017 | Westergaard | F03D 7/0276 |
| 10,612,519 B2* | 4/2020 | Franke | F03D 7/0204 |
| 10,815,967 B2* | 10/2020 | Geisler | F03D 7/0224 |
| 2013/0103202 A1* | 4/2013 | Bowyer | F03D 7/048 |
| | | | 700/275 |
| 2022/0412310 A1* | 12/2022 | Van Wingerden | F03D 7/0204 |

OTHER PUBLICATIONS

Zayas, J., "Wind Overview" 2014 Sandia's Wind Turbine Blade Workshop, Aug. 26, 2014, 32 pages.

Nygaard, N. G., "Wakes in very large wind farms and the effect of neighboring wind farms," Journal of Physics: Conference Series (2014) 524:012162, 11 pages.

El-Asha, S. et al., "Quantification of power losses due to wind turbine wake interactions through SCADA, meterological and wind LiDAR data," Wind Energy (2017) 20:1823-1839.

Herges, T. G. et al., "Detailed analysis of a waked turbine using a high-resolution scanning lidar," IOP Conf. Series: Journal of Physics: Conf. Series (2018) 1037:072009, 11 pages.

(Continued)

*Primary Examiner* — Justin D Seabe
(74) *Attorney, Agent, or Firm* — Daniel J. Jenkins

(57) ABSTRACT

Dynamic wake control (or dynamic induction control) is used to promote wake breakdown and recovery behind a wind turbine that improve wind farm performance/efficiency. Constructive interference is created by simultaneously performing harmonic rotor speed control and harmonic collective pitch control so that the phase of the rotor speed perturbations leads the phase of the collective pitch perturbations by 90-135 degrees.

13 Claims, 1 Drawing Sheet

(56) References Cited

OTHER PUBLICATIONS

Andersen, S. J. et al., "Comparison between PIV measurements and computations of the near-wake of an actuator disc," Journal of Physics: Conference Series (2014) 524:012173, 12 pages.
Sorensen, J. N. et al., "Simulation of wind turbine wakes using the actuator line technique," Philosophical Transactions A (2015) 373:20140071, 16 pages.
Ignarolo, L. E. M. et al., "Tip-vortex instability and turbulent mixing in wind-turbine wakes," J. Fluid Mech. (2015) 781:467-493.
Munters, WI. et al., Towards practical dynamic induction control of wind farms: analysis of optimally controlled wind- jarm boundary layers and sinusoidal induction control of first-row turbines, Wind Energ. Sci. (2018) 3:409-425.
Yilmaz, A. E. et al., "Optimal dynamic induction control of a pair of inline wind turbines," Phys. Fluids (2018) 30:085106, 21 pages.
Houck, D. R. et al., "Can you accelerate wind turbine wake decay with unsteady operation?" AIAA SciTech Forum (2019) San Diego, CA, Jan. 7-11, 14 pages.
Wang, C. et al., "Effects of dynamic induction control on power and loads, by LES-ALM simulations and wind tunnel experiments," Journal of Physics: Conference Series (2020) 1618:022036, 9 pages.
Bhagwat, M. J. et al., "Stability Analysis of Helicopter Rotor Wakes in Axial Flight," Journal of the American Helicopter Society (2000) 45(3):165-178.
Ivanell, S. et al., "Stability analysis of the tip vortices of a wind turbine," Wind Energy (2010) 13:705-715.
Odemark, Y. et al., "The stability and development of tip and root vortices behind a model wind turbine," Exp. Fluids (2013) 54:1591, 16 pages.
Quaranta, H. U. et al., "Long-wave instability of helical vortex," J. Fluid Mech. (2015) 780:687-716.
Marten, D et al., "Predicting Wind Turbine Wake Breakdown Using a Free Vortex Wake Code," AIAA Journal (2020) 58(11):4672-4685.
Brown, K. et al., "Rapidly Recovering Wind Turbine Wakes with Dynamic Pitch and Rotor Speed Control," AIAA SciTech Forum (2021) Jan. 11-15 & 19-21, 16 pages.

\* cited by examiner

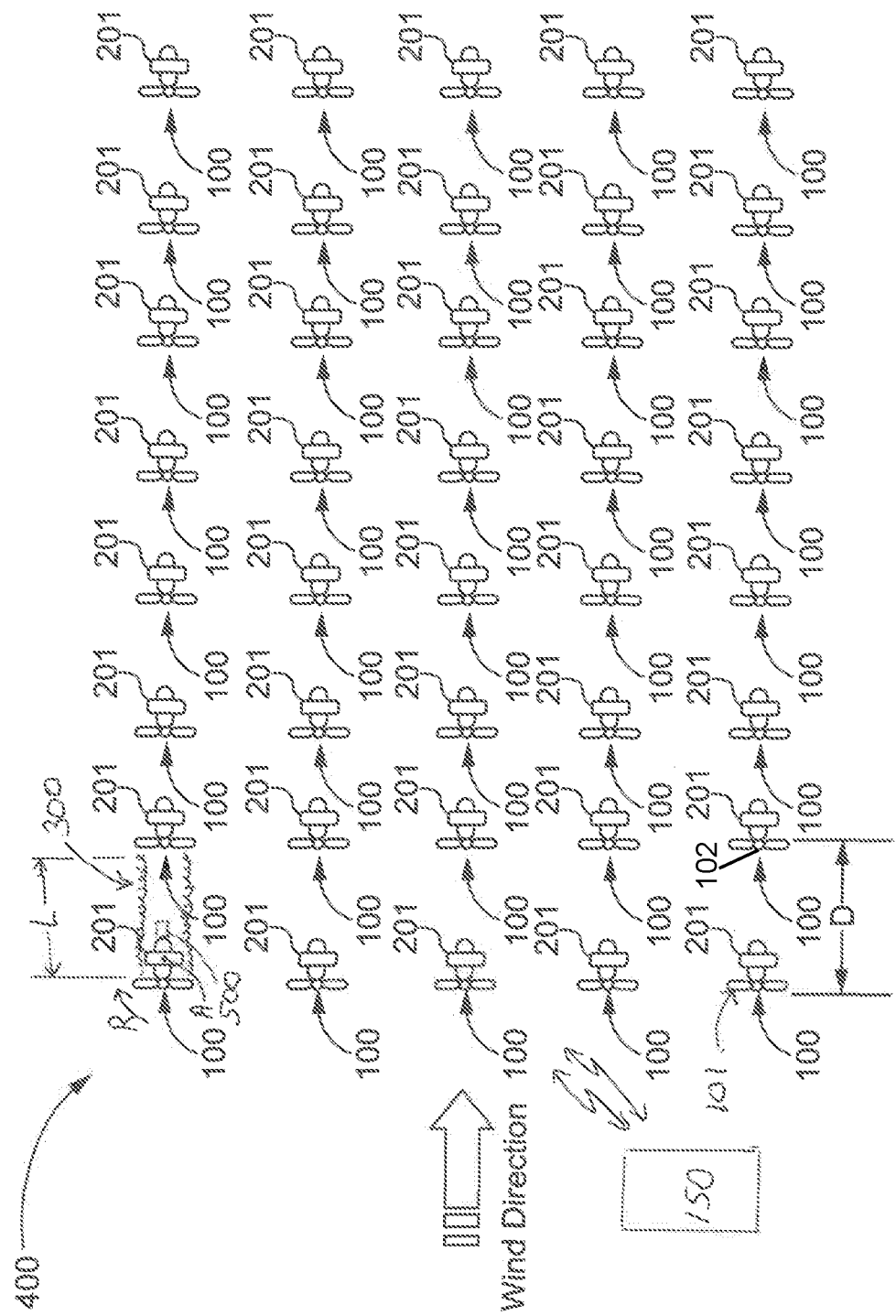

SYSTEMS AND METHODS FOR OPTIMAL PHASE SHIFT BETWEEN DYNAMIC CONTROL ACTIONS FOR WIND TURBINES

CROSS-REFERENCE TO RELATED APPLICATIONS

This application claims priority to U.S. Provisional Patent Application No. 63/298,144, filed on Jan. 10, 2022, entitled "SYSTEMS AND METHODS FOR OPTIMAL PHASE SHIFT BETWEEN DYNAMIC CONTROL ACTIONS FOR WIND TURBINE", the entirety of which is incorporated herein by reference.

STATEMENT OF GOVERNMENT INTEREST

The United States Government has rights in this invention pursuant to Contract No. DE-NA0003525 between the United State Department of Energy and National Technology & Engineering Solutions of Sandia, LLC, both for the operation of the Sandia National Laboratories.

FIELD

The present disclosure is directed to wind turbine farm operations and controls and is more particularly directed to wind turbine farm operations and controls that include dynamic wake control.

BACKGROUND

One of the largest remaining opportunities to reduce the levelized cost of wind energy will come from substantial gains in the understanding of complex wind plant aerodynamics and atmospheric phenomena, according to the U.S. Department of Energy. As evidence, measurements over a range of modern wind plants across Europe and in the U.S. show that the second row of turbines in a wind plant captures around 20% less than power than the first when the turbines are aligned with the wind, and this falls to around 40% for turbines located deep within the array. In stable atmospheric conditions, even higher losses have been observed. Advances in wind plant layouts and wake steering techniques have improved plant performance, but the turbine spacing is still fundamentally constrained by the recovery of the turbine wake. In addition to this performance aspect, the turbulence of wakes significantly degrades the fatigue life of downstream turbines.

These problems can be traced back to the failure of the wake to fully "recover" from its depleted state after passing momentum to the turbine blades. During wake recovery, large-scale structures such as those produced by instabilities over a mixing layer entrain and inject a flux of mean-flow kinetic energy from the ambient flow into the depleted wake. Most of this re-energizing occurs in the far-wake, which begins somewhere between two and four diameters downstream from the turbine.

In the near wake, there exists a rich mix of relatively organized flow features that propagate downstream of a turbine. These coherent features include a region of velocity deficit on the scale of the rotor diameter, swirling motion opposite the blades' rotation direction, an initially two-dimensional wake structure from the tower shadow, helicoidally-tracking vorticity (tip, root, and shed components), a columnar hub vortex, lateral spreading due to a pressure differential with the ambient flow, and entrainment of ambient flow promoting wake recovery, as well as any features that might be recognizable from the atmospheric boundary layer (ABL) inflow. Lignarolo et al.'s measurements showed that, within the near wake, the flow across the shear layer is governed by the periodic tip vortex structures and results in a roughly zero net recovery of mean-flow kinetic energy, the helical tip vortices effectively shielding the wake from the ambient flow. Speeding the transition to the far wake via the breakdown of the tip vortices is thus critical for wake recovery.

Despite strong literature contributions on the physics of the growth of the mutual inductance instability, relatively few studies have applied this knowledge and attempted to excite the instability. Several exceptions are described here. Following the numerical work of Ivanell et al., Odemark and Fransson demonstrated on a scaled wind turbine that the tip vortex pairing processes is affected by periodic forcing from pulsed jets emanating from the hub into the wake. The vortex pairing process, which was observed to occur between 1-2.5D from the rotor, was associated with a shift in energy from the blade passing frequency to a lower frequency depending on the initial vortex strengths of the tip vortices trailing from each blade. Quaranta et al., with a slightly more applied approach, modulated the rotor speed of a single-bladed scaled model and demonstrated that the leapfrogging position (swapping position in their notation) decreases by 60% as the initial tip axial displacement amplitude is increased from 1% to 15% of the distance between adjacent helices. Marten et al.'s lifting-line free-vortex wake method also predicts a roughly 60% reduction in near-wake length by harmonic actuation of outboard flaps at an amplitude of 10°. The dynamic wake forcing strategies leveraged by Odemark and Fransson and Quaranta et al. were conducted in low turbulence environments with ≤1% ambient turbulence intensity. Wake forcing is likely to be most successful in lower turbulent environments, such as stable ABLs, where periodic forcing can compensate for the lack of natural unsteadiness to augment the initial instability magnitude. Marten et al.'s results were made with 10% inflow turbulence intensity, though their wake modeling ignored interaction between the original freestream vortices and the added wake ones.

In general, the previous literature reviewed has presented means to reduce the near-wake length but has failed to do so without significantly increasing the loads on the turbine and/or the actuator duty of certain control vectors. Any turbine control strategy such as described above will increase the fatigue loading on the turbine and actuator duty cycle to some extent, which will reduce the lifetime of the turbine components. Thus, alternative arrangements of the above approaches may be considered to find one with the least negative consequences to the turbine loading and actuator duty cycle.

What is needed are systems and methods that satisfies one or more of these needs or provides other advantageous features. Other features and advantages will be made apparent from the present specification. The teachings disclosed extend to those embodiments that fall within the scope of the claims, regardless of whether they accomplish one or more of the aforementioned needs.

SUMMARY OF THE DISCLOSURE

The present disclosure is directed to systems and methods that provide dynamic wake control (or dynamic induction control) to promote wake breakdown and recovery behind a wind turbine. The systems and methods provide for constructive interference occurs by simultaneously performing harmonic rotor speed control and harmonic collective pitch control so that the phase of the rotor speed perturbations leads the phase of the collective pitch perturbations by 90-135 degrees.

According to an embodiment of the disclosure, a wind farm control system is disclosed that includes a first control module for controlling rotor speed and collective pitch control of a first wind turbine. The first control module oscillates rotor speed and collective pitch control at a frequency defined by a time period between two set points and an amplitude to excite inherent fluid dynamic instabilities in the wake and decrease wake length.

According to another embodiment of the disclosure, a method for controlling wake length generated by a wind turbine is disclosed that includes oscillating rotor speed and collective pitch control of a wind turbine at a frequency defined by a time period between two set points and an amplitude to excite inherent fluid dynamic instabilities in the wake and decrease wake length.

BRIEF DESCRIPTION OF THE FIGURES

FIG. 1 illustrates a wind farm according to an embodiment of the disclosure.

DETAILED DESCRIPTION OF THE DISCLOSURE

Disclosed herein are new and useful systems and methods that provide dynamic wake control (DWC) (or dynamic induction control) to promote wake breakdown and recovery behind a wind turbine by dynamic forcing of the wake to excite instability modes. This is performed by introducing an oscillation into the wake flow at an appropriate frequency to amplify the existing tip vortex instability and accelerate wake breakdown and recovery.

The harmonic oscillation, referred to herein as "oscillation," is introduced by an active wake control (a.k.a.-dynamic induction control or dynamic wake control), as it may be called, that promotes wake breakdown and recovery behind a wind turbine by periodically forcing the wake flow using rotor speed control and collective pitch control. The periodic motions caused by oscillating or periodically changing one or more of these dynamic controls excites inherent fluid dynamic instabilities in the wake, the excitation of which lead to faster annihilation of the wake structure.

The oscillations have both frequency and amplitude. The frequency is determined by @ from Equation 1 multiplied by the rotor RPM.

In an embodiment, the frequency is between 3 sec and 10 sec for an RPM range of 4 to 13 RPM.

The amplitude is determined by empirical knowledge of the tradeoff between the benefit from a shortened wake and the associated penalty to the rotor performance and reliability.

The amplitude of the rotor speed change is up to 2 RPM. In an embodiment, the rotor speed amplitude is +/−0.6 RPM of the rotor speed setpoint.

The amplitude of the collective pitch change is up to 2.9°. In an embodiment, the collective pitch is +/−1.3° of the collective pitch setpoint.

In an embodiment, the harmonic actuation of the rotor speed and collective pitch control are set in tandem with the phase of the rotor speed perturbations leading the phase of the collective pitch perturbations by a 90-135 degrees so that the synergistic effects of the actions at this phase shift reduces the near-wake length of a wind turbine more than either of the individual actions.

FIG. 1 illustrates a wind farm 400 according to an embodiment of the disclosure. As can be seen in FIG. 1, the wind farm includes a plurality of wind turbines 100, hereinafter referred to as "turbines." The turbines 100 include turbine blades 101 and a nacelle 201 and rotor 102. The wind turbines includes a tower structure (not shown) that elevates the rotor 102 off of the ground. The wind turbines 100 have an axis A about which the rotor can rotate R. In such a manner, the wind turbines 100 can be rotated to face the incoming wind direction or other direction as desired by a wind turbine operator. In this exemplary embodiment, the wind turbines 100 are positioned so the axis of the rotors are parallel to the wind direction. The blades 101 of the wind turbines 100 are separated from downwind adjacent turbines by a distance D as shown.

As further shown in FIG. 1, an exemplary wind turbine is shown generating a wake 300 in the downstream airflow of the wind turbine that becomes airflow that impacts the blades 101 of the downfield wind turbine. As has been discussed, if such wake is not broken down before impacting the downfield turbine that wake reduces the energy capture of the downstream wind turbine as compared to the upstream wind turbine.

As still further shown in FIG. 1, the wind farm 400 includes a control system 150. The control system 150 provides operational control to the wind turbines such as providing set points for rotor speed and collective pitch of the turbine blades. The control system 150 provides these controls based on operator requirements that are based on wind speed, energy production requirements and other parameters as known in the art. The control system 150 includes a processor and communication modules (not shown) for receiving operator inputs and executing commands that provide control setpoints and instructions to the wind turbines 100. In addition to these commands, the control system 150 provides dynamic wake control instructions to the wind turbines 100 to accelerate wake breakdown and recovery as discussed in this disclosure.

FIG. 1 further shows a wake measuring device 500 attached to a nacelle 201. In this exemplary embodiment, the wake measuring device 500 is a laser imaging, detection, and ranging (LIDAR) device. In other embodiments, the device 500 can be attached to other structures of the wind turbines 100 or may be remotely positioned to measure wake length L. In such a manner, the device 500 may provide wake length measurements to the control system 150 so the control system 150 may determine if the dynamic wake control instructions are effectively reducing wake length L or even if such controls are necessary for the operational and environmental conditions present.

In another embodiment, the control system 150 may use downstream energy production or wind turbine or component stresses to determine the impact of wake upon a downstream wind turbine to determine if dynamic wake control instructions are effectively reducing wake length L or even if such controls are necessary for the operational and environmental conditions present.

According to this disclosure, the dynamic forcing strategy forces of the mutual inductance instability by triggering on the nondimensional wavenumber, ω, (i.e., the number of perturbation periods per rotor revolution) as given by Equation 1:

$$\omega = N_b(k-0.5), \quad (1)$$

where $N_b$ is the number of turbine blades and k are positive integers. The k=1 mode has been found to be primarily responsible for the transition to the non-linear instability growth regime that is characteristic of the beginning of the wake breakdown process.

According to an embodiment, one such arrangement that is novel is to use two or more control vectors in coordination to improve the benefit of optimal forcing strategies that encourage wake recovery. In an embodiment, the control is obtained by using blade pitch and rotor speed control in coordination.

For the invention presented here, the dynamic pitch setting, p, (an increase in p corresponds to a reduction in blade angle of attack) relative to that of the conventional control setting, $p_0$, is described by the equation $$p = p_0 + a_p \sin(\omega_p \theta + \phi_p), \quad (2)$$

where $a_p$ indicates the dynamic pitch amplitude, $\omega_p$ is the angular perturbation wavenumber described in Equation 1, θ is the rotor azimuthal angle, and $\phi_p$ is any phase offset. The dynamic rotor rotational frequency, f, relative to that of the conventional control setting, $f_0$, is described by the equation $$f = f_0 + a_f \sin(\omega_f \theta + \phi_f), \quad (3)$$

where the subscript f is used to now distinguish between variables of the same names from Equation 2.

Results have been demonstrated with a free-vortex wake method simulation for a variety of amplitudes of the harmonic motions. For a tandem configuration of a sweep of $\phi_f$ with constant $\phi_p$, varying the relative phase between the rotor speed and pitch forcing indicates a preferential phase shift of or between 90-135° ahead of $\phi_p$ produces the most constructive superposition of forcing waveforms and resulting reduction of near-wake length, $(x/D)_{nl}$. This trend is constant across the range of $a_p$ amplitudes, though greater values of $a_p$ for the given $a_f$ clearly offer the greatest potential reduction of $(x/D)_{nl}$. For the largest $a_p$ of 1.30°, the tandem result has a 30-31% lower $(x/D)_{nl}$ than either of the individual cases of the same forcing amplitudes.

While the exemplary embodiments illustrated in the figures and described herein are presently preferred, it should be understood that these embodiments are offered by way of example only. Accordingly, the present application is not limited to a particular embodiment, but extends to various modifications that nevertheless fall within the scope of the appended claims. The order or sequence of any processes or method steps may be varied or re-sequenced according to alternative embodiments.

It is important to note that the construction and arrangement of the various exemplary embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited in the claims. For example, elements shown as integrally formed may be constructed of multiple parts or elements, the position of elements may be reversed or otherwise varied, and the nature or number of discrete elements or positions may be altered or varied. Accordingly, all such modifications are intended to be included within the scope of the present application. The order or sequence of any process or method steps may be varied or re-sequenced according to alternative embodiments. In the claims, any means-plus-function clause is intended to cover the structures described herein as performing the recited function and not only structural equivalents but also equivalent structures. Other substitutions, modifications, changes and omissions may be made in the design, operating conditions and arrangement of the exemplary embodiments without departing from the scope of the present application.

It should be noted that although the figures herein may show a specific order of method steps, it is understood that the order of these steps may differ from what is depicted.

What is claimed is:

1. A wind farm control system, comprising:
   a first control module for controlling rotor speed and collective pitch control of a first wind turbine;
   wherein the first control module oscillates rotor speed and collective pitch control at a frequency and an amplitude to excite inherent fluid dynamic instabilities in the wake and decrease wake length; and
   a second control module for determining downstream turbine energy efficiency changes at a downstream turbine resulting from periodically changing the rotor speed and collective pitch control between a time period of two set points to excite inherent fluid dynamic instabilities in the wake and decrease wake length;
   wherein the downstream turbine energy efficiency changes are used by the first control module to determine the oscillation frequency and amplitude; and
   wherein the first controller oscillates the rotor speed and collective pitch provides constructive aerodynamic interference from harmonic actuation of the rotor speed and collective pitch being performed in tandem with the phase of the rotor speed perturbations leads the phase of the collective pitch perturbations by a 90-135 degrees so that synergistic effects of actions at this phase shift reduces the near-wake length of the wind turbine more than either of the individual actions.

2. The system of claim 1, wherein the amplitude of the rotor speed change is up to 2 RPM.

3. The system of claim 1, wherein the amplitude of the collective pitch change is up to 2.9°.

4. The system of claim 1, wherein the first control module receives the RPM of the wind turbine and uses the RPM to determine the amplitude of the oscillation.

5. The system of claim 1, wherein another controller determines the frequency and amplitude of the parameter changes based on energy capture and load oscillation upon the blade and/or wind turbine tower and/or wind turbine drivetrain components.

6. The system of claim 1, wherein the first wind turbine is upstream from a second wind turbine downstream of the wake.

7. The control system of claim 1, further comprising:
   an operational control module for controlling wind turbine angle into an incoming wind direction.

8. A method for controlling wake length generated by a wind turbine, comprising:
   oscillating rotor speed and collective pitch control of a wind turbine at a frequency and an amplitude to excite inherent fluid dynamic instabilities in the wake and decrease wake length; and
   measuring wake length from a blade of the wind turbine to a wake terminus in a downstream wind direction from the blade and providing the wake length data to a controller that provides control commands to perform the oscillating rotor speed and collective pitch control;
   wherein oscillating the rotor speed and collective pitch provides constructive aerodynamic interference from harmonic actuation of the rotor speed and collective pitch being performed in tandem with the phase of the rotor speed perturbations leads the phase of the collective pitch perturbations by a 90-135 degrees so that synergistic effects of actions at this phase shift reduces the near-wake length of the wind turbine more than either of the individual actions.

9. The method of claim 8, wherein the amplitude of the rotor speed change is up to 2 RPM.

10. The method of claim 8, wherein the amplitude of the collective pitch change is up to 2.9°.

11. The method of claim 8, further comprising:
receiving the RPM of the wind turbine and using the RPM to determine the amplitude of oscillation.

12. The method of claim 8, further comprising:
determining the frequency and amplitude of the parameter changers based on energy capture and load oscillation upon the blade and/or wind turbine tower and/or wind turbine drivetrain components.

13. The method of claim 8, further comprising:
controlling wind turbine angle into an incoming wind direction.

\* \* \* \* \*